United States Patent
Singer et al.

(10) Patent No.: US 11,329,332 B2
(45) Date of Patent: May 10, 2022

(54) BATTERY STRUCTURE WITH INTERNAL THERMAL CONTROL

(71) Applicant: INTERNATIONAL BUSINESS MACHINES CORPORATION, Armonk, NY (US)

(72) Inventors: Noah Singer, White Plains, NY (US); John S. Werner, Fishkill, NY (US); Budy Notohardjono, Poughkeepsie, NY (US); Arkadiy O. Tsfasman, Wappingers Falls, NY (US); John Torok, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 151 days.

(21) Appl. No.: 16/811,377

(22) Filed: Mar. 6, 2020

(65) Prior Publication Data

US 2021/0280928 A1 Sep. 9, 2021

(51) Int. Cl.
*H01M 10/6556* (2014.01)
*H01M 10/04* (2006.01)
(Continued)

(52) U.S. Cl.
CPC ... *H01M 10/6556* (2015.04); *H01M 10/0422* (2013.01); *H01M 10/0431* (2013.01);
(Continued)

(58) Field of Classification Search
None
See application file for complete search history.

(56) References Cited

U.S. PATENT DOCUMENTS

| 5,609,972 A | * | 3/1997 | Kaschmitter | ....... H01M 50/572 |
| | | | | 429/61 |
| 5,741,606 A | * | 4/1998 | Mayer | ................. H01M 50/578 |
| | | | | 429/57 |

(Continued)

FOREIGN PATENT DOCUMENTS

| CN | 206976432 U | 2/2018 |
| CN | 207038662 U | 2/2018 |

(Continued)

OTHER PUBLICATIONS

Worwood et al. "A new approach to the internal thermal management of cylindrical battery cells for automotive applications", Journal of Power Sources 346 (2017). 16p.

(Continued)

*Primary Examiner* — Lisa S Park
(74) *Attorney, Agent, or Firm* — Cantor Colburn LLP; Tihon Poltavets (57) ABSTRACT

A battery structure is provided. The battery structure includes a casing, a jelly roll assembly, electrodes, insulation and a thermal control feature. The casing includes an internal tube defining a central hole. The jelly roll assembly is disposed with an electrolyte in an annular space about the internal tube within the casing. The electrodes are electrically coupled to the jelly roll assembly and disposed to extend out of the casing. The insulation is disposed to insulate the jelly roll assembly and the electrodes from the casing. The thermal control feature is communicative with the central hole and configured to control battery structure temperatures proximate to the central hole.

19 Claims, 5 Drawing Sheets

(51) Int. Cl.
*H01M 10/63* (2014.01)
*H01M 10/6567* (2014.01)
*H01M 10/643* (2014.01)
*H01M 50/342* (2021.01)

(52) U.S. Cl.
CPC ......... *H01M 10/63* (2015.04); *H01M 10/643* (2015.04); *H01M 10/6567* (2015.04); *H01M 50/3425* (2021.01); *H01M 2200/20* (2013.01)

(56) References Cited

U.S. PATENT DOCUMENTS

| | | | |
|---|---|---|---|
| 10,193,196 B1 * | 1/2019 | Bustamante | H01M 10/613 |
| 2002/0028374 A1 * | 3/2002 | Yoshida | H01M 10/0431 |
| | | | 429/94 |
| 2006/0093903 A1 | 5/2006 | Hong et al. | |
| 2007/0269685 A1 * | 11/2007 | Chu | H01M 10/0431 |
| | | | 429/3 |
| 2009/0070989 A1 * | 3/2009 | Pozin | H01M 4/5815 |
| | | | 29/623.5 |
| 2010/0243345 A1 * | 9/2010 | Yebka | H01M 50/572 |
| | | | 180/65.1 |
| 2011/0262783 A1 | 10/2011 | Mehta | |
| 2012/0147923 A1 * | 6/2012 | Schmidt | G01K 13/02 |
| | | | 374/158 |
| 2017/0331142 A1 * | 11/2017 | Nicholls | H01M 10/643 |
| 2020/0185160 A1 * | 6/2020 | Tashiro | H01M 10/6555 |

FOREIGN PATENT DOCUMENTS

| | | |
|---|---|---|
| CN | 108183255 A | 6/2018 |
| JP | H11329514 A | 11/1999 |
| JP | 4596442 B2 | 12/2010 |
| KR | 930004168 B1 | 5/1993 |
| KR | 100887830 B1 | 3/2009 |
| KR | 20090113430 A | 11/2009 |

OTHER PUBLICATIONS

Zhao et al. "Optimization of a phase change material based internal cooling system for cylindrical Li-ion battery pack and a hybrid cooling design". Energy 135. (2017), 12p.

\* cited by examiner

BATTERY STRUCTURE WITH INTERNAL THERMAL CONTROL

BACKGROUND

The present invention generally relates to batteries and, more specifically, to a battery structure with internal cooling and heating.

In lithium-ion batteries, positive and negative plates are jelly rolled inside a battery case. The positive and negative plates are separated from one another by a separator and by an insulating ring to prevent a short circuit. The positive and negative plates are connected to tabs. The tabs connect to positive and negative terminals on opposite ends of the battery. Space in the center of the jelly rolled plates is often unused.

SUMMARY

Embodiments of the present invention are directed to a battery structure. A non-limiting example of the battery structure includes a casing, a jelly roll assembly, electrodes, insulation and a thermal control feature. The casing includes an internal tube defining a central hole. The jelly roll assembly is disposed with an electrolyte in an annular space about the internal tube within the casing. The electrodes are electrically coupled to the jelly roll assembly and are disposed to extend out of the casing. The insulation is disposed to insulate the jelly roll assembly and the electrodes from the casing. The thermal control feature is communicative with the central hole and configured to control battery structure temperatures proximate to the central hole.

Embodiments of the present invention are directed to a multiple battery structure assembly. A non-limiting example of the multiple battery structure assembly includes multiple battery structures and a thermal control feature. Each battery structure includes a casing, a jelly roll assembly, electrodes and insulation. The casing includes an external tube, an internal tube defining a central hole, a lower cover and an upper cover assembly. The jelly roll assembly includes an anode, a separator and a cathode. The jelly roll assembly is disposed with an electrolyte in an annular space between the external and internal tubes and between the lower cover and the upper cover assembly. The electrodes are electrically coupled to the anode and the cathode and are disposed to extend out of the casing. The insulation is disposed to insulate the jelly roll assembly and the electrodes from the casing. The thermal control feature is communicative with the central hole of each battery structure and is configured to control battery structure temperatures proximate to each of the central holes.

Embodiments of the present invention are directed to a method of assembling a battery structure. A non-limiting example of the method includes forming a casing including an internal tube defining a central hole, disposing a jelly roll assembly in an annular space about the internal tube within the casing, filling the casing with an electrolyte, electrically coupling electrodes to the jelly roll assembly such that the electrodes extend out of the casing, insulating the jelly roll assembly and the electrodes from the casing and communicating, with the central hole, a thermal control feature configured to control battery structure temperatures proximate to the central hole.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

One or more embodiments of the present invention provide for a cylindrical battery structure with an axial hole that in turn provides for thermal control through cooling or heating features.

Keeping batteries, such as lithium-ion batteries, at an optimal temperature can be a difficult task. This is often due to the fact that usage of a lithium-ion battery generates heat while an electrode assembly in the lithium-ion battery is usually tightly packed within a cell case. While the issue of temperature maintenance has been observed, current methods of lithium-ion battery cooling (e.g., fans or other similar air flow generating features) and heating (e.g., by heating elements) can provide inefficient cooling or heating effects. The inefficiencies arise because the hottest temperatures within a lithium-ion battery assembly are typically exhibited at the center of the cell and the fans, in particular, do not direct cooling flow toward those hottest temperature locations. Meanwhile, when heating is needed, heating elements usually only provide heating at a cell exterior.

Thus, due to unstable battery chemistries, there exists the possibility of a lithium-ion battery cell experiencing thermal runaway. Manufacturers will therefore encase lithium-ion batteries such that the impacts of a thermal runaway event are contained. This can lead to lithium-ion batteries reaching even higher internal temperatures.

Figure 1:
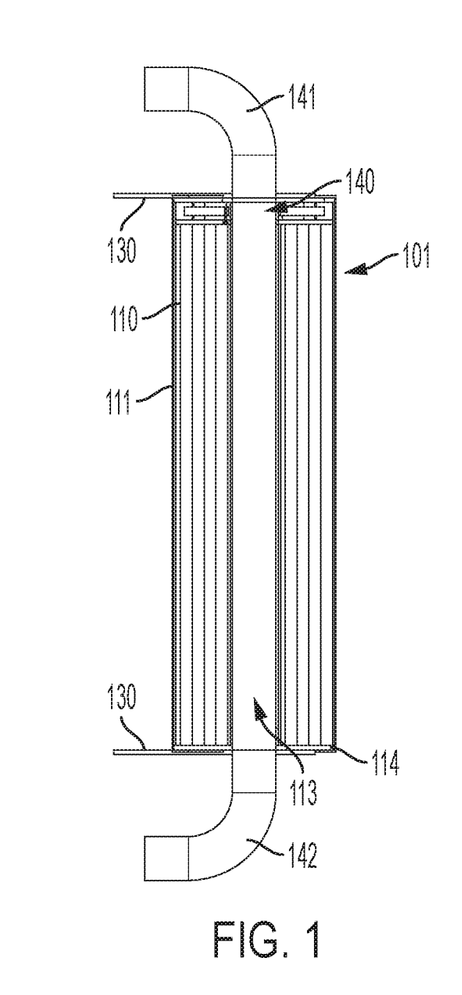
FIG. 1 is a side view of a battery structure in accordance with one or more embodiments of the present invention.
Figure 2:
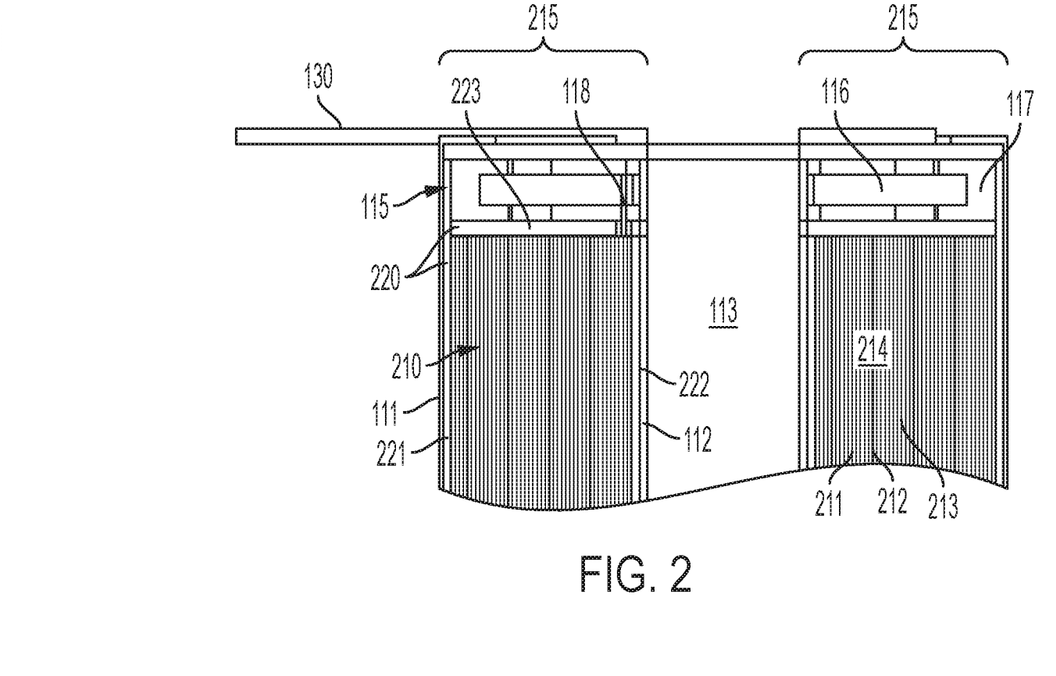
FIG. 2 is a sectional view of a portion of the battery structure of FIG. 1 in accordance with one or more embodiments of the present invention.

Turning now to FIGS. 1 and 2, a battery structure 101 is provided. The battery structure 101 includes a casing 110, a jelly roll assembly 210 (see FIG. 2), electrodes 130, insulation 220 (see FIG. 2) and a thermal control feature 140.

The casing 110 includes an external tube 111, an internal tube 112 that is formed to define a central axial hole 113, a lower cover 114 and an upper cover assembly 115. The external tube 111 and the internal tube 112 can be substantially cylindrical in shape and the central axial hole 113 can extend through an entirety of a length of the casing 110. The central axial hole 113 can be, but is not required to be, coaxial with a central longitudinal axis of the casing 110. The lower cover 114 and the upper cover assembly 115 are both formed to define apertures or holes corresponding to the central axial hole 113 and are both sealed at respective outer diameters thereof to the external tube 111 and at respective inner diameters thereof to the internal tube 112. The casing 110 can be formed of metallic materials such as, but not limited to, aluminum and aluminum alloys.

As shown in FIG. 2, the jelly roll assembly 210 includes an anode 211, a separator 212 and a cathode 213. The anode 211 and the cathode 213 are rolled together with the separator interposed between them in the roll. The jelly roll assembly 210 is disposed with an electrolyte 214 in an annular space 215 between an internal surface of the external tube 111 and an external surface of the internal tube 112 and between the lower cover 114 and the upper cover assembly 115. In particular, the jelly roll assembly 210 can be wrapped around the internal tube 112 and the central axial hole 113.

The electrodes 130 can include or be provided as upper and lower electrodes 130 with one of the electrodes 130 electrically coupled to the anode 211 and the other of the electrodes 130 electrically coupled to the cathode 213. The electrodes 130 can be disposed to extend out of the casing 110 from the electrical coupling with the jelly roll assembly 210. The insulation 220 is disposed between each component of the casing 110 and each component of the jelly roll assembly 210 and the electrodes 130. The insulation 220 thus insulates the jelly roll assembly 210 and the electrodes 130 from the casing 110.

As shown in FIG. 2, the insulation 220 includes an external tube insulation portion 221 to insulate the jelly roll assembly 210 from the external tube 111, an internal tube insulation portion 222 to insulate the jelly roll assembly 210 from the internal tube 112 and an insulation ring 223. The insulation ring 223 is disposed to insulate the jelly roll assembly 210 from the upper cover assembly 115. The upper cover assembly 115 is configured to execute a burst action in an event of overheating or another failure in order to alleviate pressure within the casing or to prevent an overheated condition from worsening. To this end, the upper cover assembly 115 includes a burst disk 116, an insulating cap 117 surrounding the burst disk 116 and a tab 118. The tab 118 connects the burst disk 116 to either the anode 211 or the cathode 213 of the jelly roll assembly 210 through the insulating cap 117 and the insulation ring 223. The insulating ring 223, the burst disk 116 and the insulating cap 117 can all be formed to define apertures or holes corresponding to the central axial hole 113.

The thermal control feature 140 is communicative with the central axial hole 113 and is configured to control battery structure temperatures proximate to the central axial hole 113. That is, to the extent that the thermal control feature 140 can direct coolant or heated fluid through the central axial hole 113 (i.e., in order to regulate or maintain a temperature of the battery structure 101), the coolant or the heated fluid engages in thermal transfer with the more centralized portions of the battery structure 101. For example, when the thermal control feature 140 directs coolant through the central axial hole 113, the coolant removes heat from the portions of the battery structure 101 closest to the central axial hole 113 (i.e., the internal tube 112 and the proximal turns of the anode 211, the separator 212 and the cathode 213 of the jelly roll assembly 210). This heat removal in turn results in overall heat transfer from the battery structure 101 to the coolant and a reduction in an overall temperature of the battery structure 101.

Regardless of whether the thermal control feature 140 directs coolant or heat fluid through the central axial hole 113, the thermal control feature 140 can include an inlet 141 fluidly coupled with a first end of the central axial hole 113 and an outlet 142 fluidly coupled with a second end of the central axial hole 113. In the exemplary case of the thermal control feature 140 directing coolant through the central axial hole 113, the inlet 141 can be provided as a coolant inlet and the outlet 142 can be provided as a warm liquid outlet.

Figure 3:
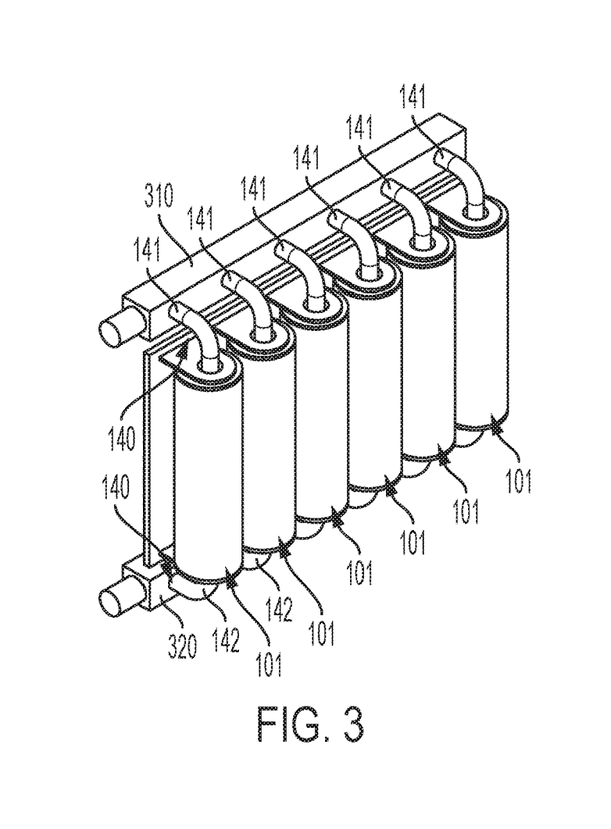
FIG. 3 is a perspective view of an assembly of multiple battery structures in a parallel arrangement in accordance with one or more embodiments of the present invention.
Figure 4:
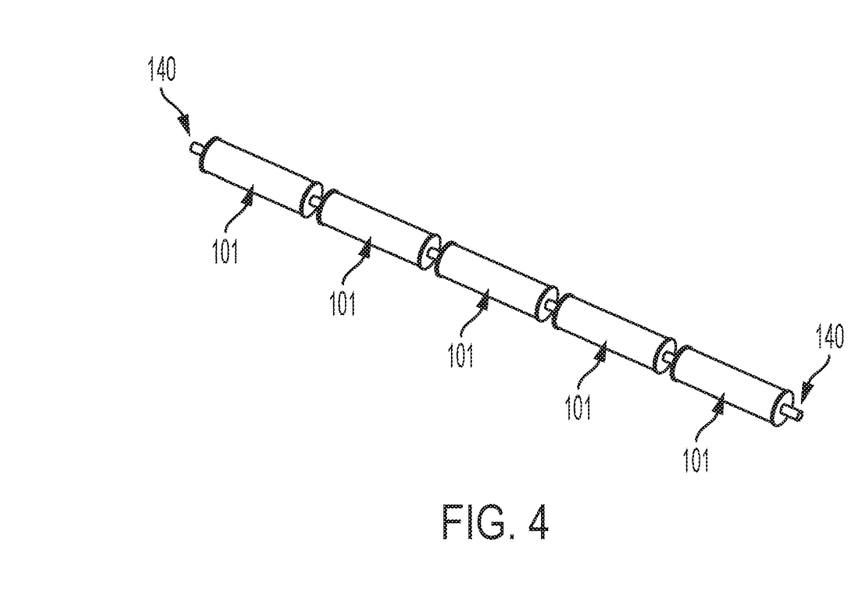
FIG. 4 is a perspective view of an assembly of multiple battery structures in a serial arrangement in accordance with one or more embodiments of the present invention.

With reference to FIGS. 3 and 4, a multiple battery structure assembly 301 is provided as shown in FIG. 3 and a multiple battery structure assembly 401 is provided as shown in FIG. 4.

The multiple battery structure 301 of FIG. 3 includes multiple battery structures 101 as shown in FIG. 1 and described above and the thermal control feature 140 where the thermal control feature 140 is communicative with the central axial hole 113 (see FIG. 1) of each battery structure 101 in parallel whereby the thermal control feature 140 is configured to control battery structure temperatures proximate to each of the central axial holes 113. Here, the thermal control feature 140 can further include an inlet manifold 310 that distributes coolant or heated fluid to each of the inlets 141 and an outlet manifold 320 that is fluidly coupled to each of the outlets 142.

The multiple battery structure 401 of FIG. 4 includes multiple battery structures 101 as shown in FIG. 1 and described above and the thermal control feature 140 where the thermal control feature 140 is communicative with the central axial hole 113 (see FIG. 1) of each battery structure 101 in series whereby the thermal control feature 140 is configured to control battery structure temperatures proximate to each of the central axial holes 113.

Figure 5:
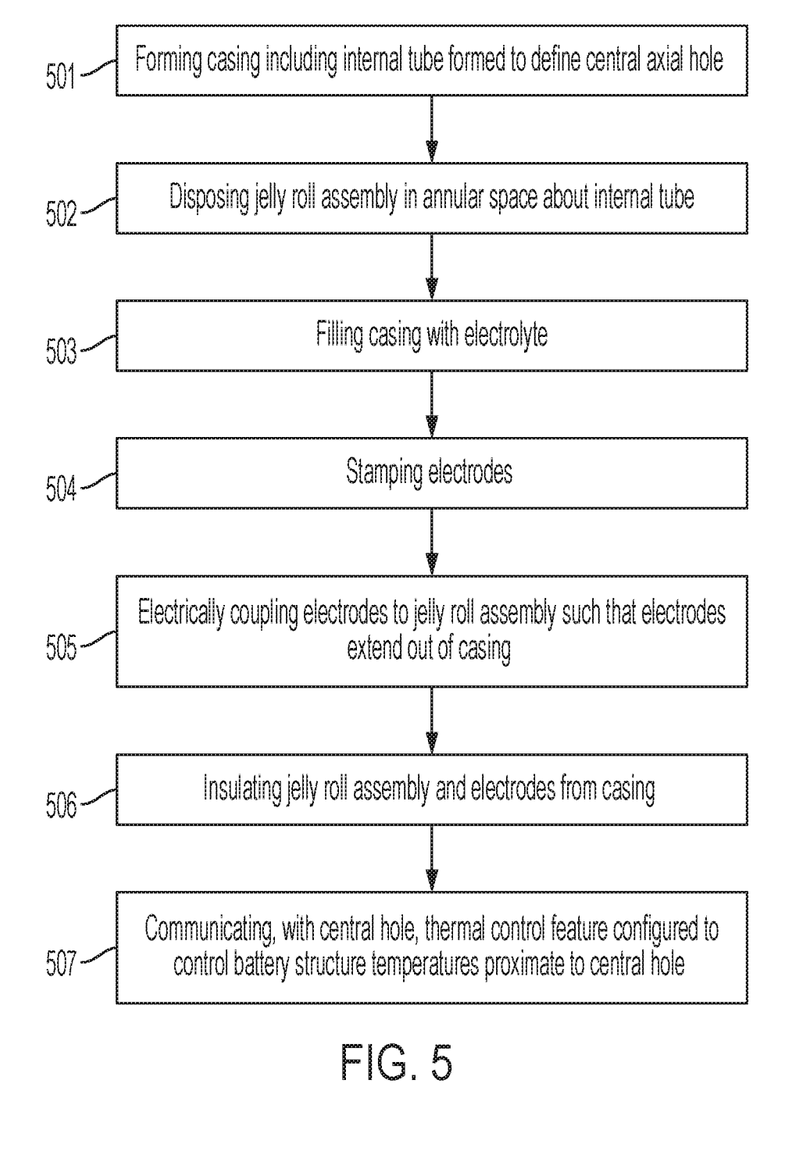
FIG. 5 is a flow diagram illustrating a method of assembling a battery structure in accordance with one or more embodiments of the present invention.

With reference to FIG. 5, a method of assembling a battery structure, such as the battery structure 101 described above, is provided. The method includes forming a casing where the casing includes an internal tube that is formed to define a central axial hole (501) and disposing a jelly roll assembly in an annular space about the internal tube within the casing (502). The method further includes filling the casing with an electrolyte (503), stamping electrodes (504), electrically coupling electrodes to the jelly roll assembly such that the electrodes extend out of the casing (505) and insulating the jelly roll assembly and the electrodes from the casing (506). The method also includes communicating, with the central hole, a thermal control feature that is configured to control battery structure temperatures proximate to the central hole (507).

In accordance with one or more further embodiments of the invention, the method can further include assembling multiple battery structures and the communicating of the thermal control feature with the central hole of operation 507 can include communicating the thermal control feature with the central axial hole of each battery structure in parallel or in series.

Various alternative sequences of the operations of the method of FIG. 5 will now be described with reference to FIGS. 6 and 7.

Figure 6:
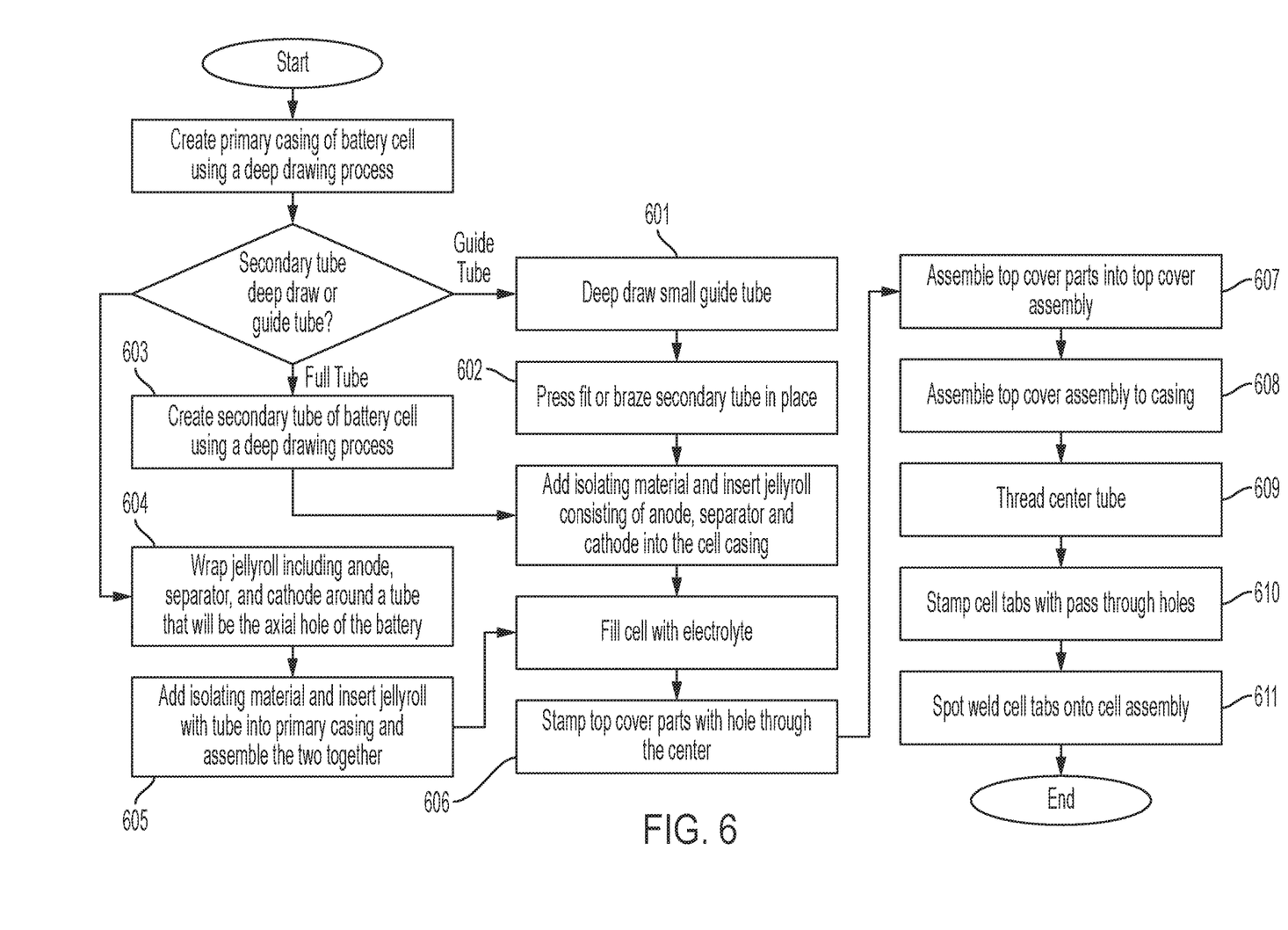
FIG. 6 is a graphical flow diagram illustrating a method of assembling a battery structure in accordance with one or more embodiments of the present invention.
Figure 7:
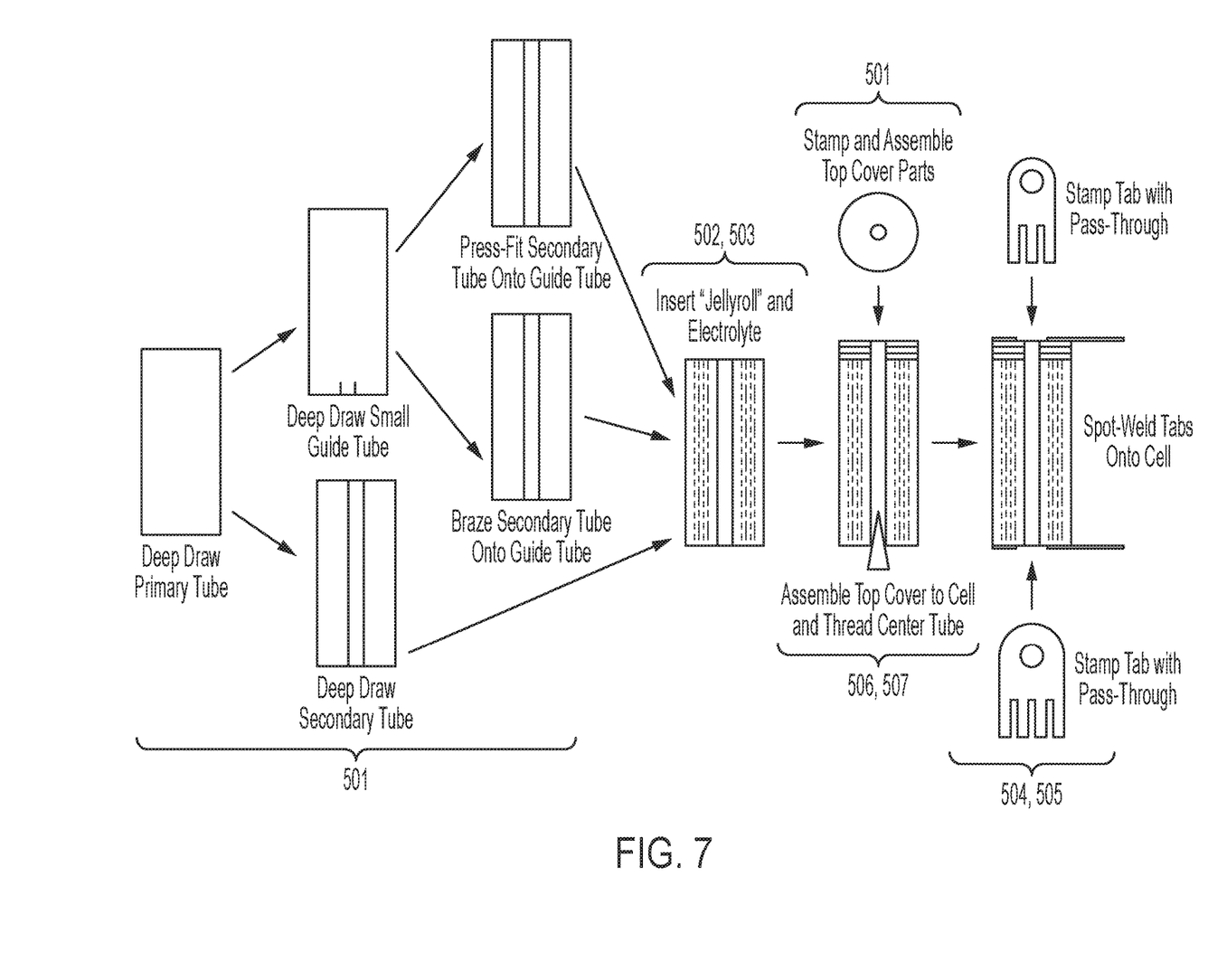
FIG. 7 is a graphical schematic diagram illustrating a method of assembling a battery structure in accordance with one or more embodiments of the present invention.

As shown in FIGS. 6 and 7, the forming of the casing of operation 501 can begin with a creation of a primary casing of a battery cell using a deep drawing process or another similar process and a decision to create the internal tube through deep draw process or by using a secondary tube.

As shown in FIGS. 6 and 7, the forming of the internal tube of operation 501 can include a deep draw processing of a small guide tube (601) and an attaching of a secondary tube to the small guide tube (602) which may be done via press fitting or brazing. In this or other cases, the insulating of operation 506 can include adding insulation to the casing prior to the disposing of the jelly roll assembly in the annular space of operation 502 and prior to the filling of the casing with the electrolyte of operation 503. Alternatively, as shown in FIGS. 6 and 7, the forming of the internal tube of operation 501 can include a full deep draw processing of a full guide tube (603). In this or other cases, the insulating of operation 506 can include adding insulation to the casing prior to the disposing of the jelly roll assembly in the annular space of operation 502 and prior to the filling of the casing with the electrolyte of operation 503.

As another alternative, as shown in FIGS. 6 and 7, the disposing of the jelly roll assembly of operation 502 can include wrapping the jelly roll assembly around either the small guide tube and the secondary guide tube or the full guide tube (604) and the insulating of the jelly roll assembly can include adding insulation between the casing and the jelly roll assembly (605) prior to the filling of the casing with the electrolyte of operation 503.

Additional features and operations of the method of FIG. 5 will now be described with continued reference to FIGS. 6 and 7.

As shown in FIGS. 6 and 7, the forming of the casing of operation 501 can include forming an upper cover assembly by stamping upper cover components (606) and by assembling the upper cover components together (607) and then to the casing (608) and the communicating of the thermal control feature with the central hole of operation 507 can include threading a center tube through the central axial hole (609). In addition, the electrically coupling of the electrodes to the jelly roll assembly such that the electrodes extend out of the casing of operation 505 can include stamping cell tabs with pass through holes (610) and spot welding the cell tabs onto the assembly (611).

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A battery structure, comprising:
    a casing comprising an internal tube defining a central hole;
    a jelly roll assembly disposed with an electrolyte in an annular space about the internal tube within the casing;
    electrodes electrically coupled to the jelly roll assembly and disposed to extend out of the casing;
    insulation disposed to insulate the jelly roll assembly and the electrodes from the casing; and
    a thermal control feature communicative with the central hole and configured to control battery structure temperatures proximate to the central hole,
    wherein the casing comprises an upper cover assembly comprising:
    a burst disk; and
    a tab connecting the burst disk to the jelly roll assembly through the insulation, the tab being elongate along a long axis of the internal tube and having a first end terminating at the jelly roll assembly and a second end terminating at a surface of the burst disk.

2. The battery structure according to claim 1, wherein the casing is cylindrical and the central hole is a central axial hole extending through an entirety of the casing.

3. The battery structure according to claim 1, wherein the upper cover assembly comprises:
    the burst disk;
    an insulating cap surrounding the burst disk; and
    the tab connecting the burst disk to the jelly roll assembly through the insulating cap and the insulation.

4. The battery structure according to claim 1, wherein the thermal control feature comprises:
    an inlet fluidly coupled with a first end of the central hole; and
    an outlet fluidly coupled with a second end of the central hole.

5. A multiple battery structure assembly, comprising:
    multiple battery structures, each comprising:
        a casing comprising an external tube, an internal tube defining a central hole, a lower cover and an upper cover assembly;
        a jelly roll assembly comprising an anode, a separator and a cathode, the jelly roll assembly being disposed with an electrolyte in an annular space between the external and internal tubes and between the lower cover and the upper cover assembly;
        electrodes electrically coupled to the anode and the cathode and disposed to extend out of the casing; and
        insulation disposed to insulate the jelly roll assembly and the electrodes from the casing; and
    a thermal control feature communicative with the central hole of each battery structure and configured to control battery structure temperatures proximate to each of the central holes,
    wherein, for each of the multiple battery structures, the casing comprises an upper cover assembly comprising:
    a burst disk; and
    a tab connecting the burst disk to the corresponding jelly roll assembly through the corresponding insulation, the tab being elongate along a long axis of the corresponding internal tube and having a first end terminating at the corresponding jelly roll assembly and a second end terminating at a surface of the burst disk.

6. The multiple battery structure assembly according to claim 5, wherein the casing is cylindrical and the central hole is a central axial hole extending through an entirety of the casing.

7. The multiple battery structure assembly according to claim 5, wherein the upper cover assembly comprises:
    the burst disk;
    an insulating cap surrounding the burst disk; and
    the tab connecting the burst disk to the corresponding jelly roll assembly through the insulating cap and the corresponding insulation.

8. The multiple battery structure assembly according to claim 5, wherein the insulation comprises:

an external tube insulation portion to insulate the jelly roll assembly from the external tube;

an internal tube insulation portion to insulate the jelly roll assembly from the internal tube; and an insulation ring to insulate the jelly roll assembly from the upper cover assembly.

9. The multiple battery structure assembly according to claim 5, wherein the thermal control feature comprises:

an inlet fluidly coupled with a first end of the central hole; and an outlet fluidly coupled with a second end of the central hole.

10. The multiple battery structure assembly according to claim 5, wherein the thermal control feature is communicative with the central hole of each battery structure in parallel.

11. The multiple battery structure assembly according to claim 5, wherein the thermal control feature is communicative with the central hole of each battery structure in series.

12. A method of assembling a battery structure, the method comprising:

forming a casing comprising an internal tube defining a central hole;

disposing a jelly roll assembly in an annular space about the internal tube within the casing;

filling the casing with an electrolyte;

electrically coupling electrodes to the jelly roll assembly such that the electrodes extend out of the casing;

insulating the jelly roll assembly and the electrodes from the casing; and communicating, with the central hole, a thermal control feature configured to control battery structure temperatures proximate to the central hole, the forming of the internal tube comprises deep draw processing of a small guide tube and attaching a secondary tube to the small guide tube.

13. The method according to claim 12, wherein the insulating comprises adding insulation to the casing prior to the disposing of the jelly roll assembly in the annular space and the filling of the casing with the electrolyte.

14. The method according to claim 12, wherein: the disposing of the jelly roll assembly comprises wrapping the jelly roll assembly around either the small guide tube and the secondary guide tube or the full guide tube, and the insulating of the jelly roll assembly comprises adding insulation between the casing and the jelly roll assembly prior to the filling of the casing with the electrolyte.

15. The method according to claim 12, wherein the forming of the casing comprises forming an upper cover assembly by stamping and assembling upper cover components together.

16. The method according to claim 12, wherein the communicating of the thermal control feature with the central hole comprises threading a center tube through the central hole.

17. The method according to claim 12, wherein the method further comprises stamping the electrodes.

18. The method according to claim 12, wherein:

the method further comprises assembling multiple battery structures; and the communicating of the thermal control feature with the central hole comprises communicating the thermal control feature with the central hole of each battery structure in parallel.

19. The method according to claim 12, wherein:

the method further comprises assembling multiple battery structures; and the communicating of the thermal control feature with the central hole comprises communicating the thermal control feature with the central hole of each battery structure in series.

* * * * *